United States Patent
Johansson et al.

(10) Patent No.: US 8,964,545 B2
(45) Date of Patent: Feb. 24, 2015

(54) MOBILE NODE ENTRY AT RADIO ACCESS ARRANGEMENT RESTART

(75) Inventors: Magnus Johansson, Gothenburg (SE); Roland Carlsson, Ojersjo (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 282 days.

(21) Appl. No.: 13/201,295

(22) PCT Filed: Feb. 16, 2009

(86) PCT No.: PCT/EP2009/051797
§ 371 (c)(1),
(2), (4) Date: Aug. 12, 2011

(87) PCT Pub. No.: WO2010/091737
PCT Pub. Date: Aug. 19, 2010

(65) Prior Publication Data
US 2011/0292794 A1    Dec. 1, 2011

(51) Int. Cl.
*G01R 31/08*   (2006.01)
*H04J 3/14*   (2006.01)
*H04W 48/06*   (2009.01)
*H04W 28/08*   (2009.01)
*H04W 74/00*   (2009.01)
*H04W 74/08*   (2009.01)

(52) U.S. Cl.
CPC ............. *H04W 48/06* (2013.01); *H04W 28/08* (2013.01); *H04W 74/006* (2013.01); *H04W 74/0833* (2013.01)
USPC .......................................... 370/232; 370/468

(58) Field of Classification Search
CPC ............ H04L 43/0852; H04L 43/0829; H04L 43/087; H04L 43/16; H04L 41/5003
See application file for complete search history.

(56) References Cited

U.S. PATENT DOCUMENTS

| | | | | |
|---|---|---|---|---|
| 6,400,954 B1 * | 6/2002 | Khan et al. | .................... | 455/450 |
| 2006/0153131 A1 * | 7/2006 | Kang et al. | .................... | 370/329 |
| 2009/0323634 A1 * | 12/2009 | Kim et al. | ...................... | 370/331 |
| 2010/0020781 A1 * | 1/2010 | Tayloe et al. | ................. | 370/342 |

FOREIGN PATENT DOCUMENTS

WO    2007103619 A2    9/2007

OTHER PUBLICATIONS

Koo, Changhoi, et al., "Individual Backoff Time Allocation for Each Ranging Code Set", IEEE 802.16 Presentation Submission Template [Online], vol. C802.16A-01/57, May 15, 2002, pp. 1-12, XP008101934.

* cited by examiner

*Primary Examiner* — Jung Park
(74) *Attorney, Agent, or Firm* — Rothwell, Figg, Ernst & Manbeck P.C.

(57) ABSTRACT

The invention relates to communication between mobile nodes and/or node arrangements in wireless communication networks. In particular, the invention relates to a method in a radio access arrangement for improving the balance between the capacity allocated to initial access for network entry and the capacity allocated to payloads in the radio access arrangement. The radio access arrangement is configured to operatively communicate with a plurality of mobile nodes via an air interface. First, an initial access capacity is set to a value (S2), and then a current initial access load is obtained (S3). The next step is to increase (S7) the initial access capacity provided by the radio access arrangement (212, 312) if the current initial access load exceeds a predetermined upper limit (S4).

14 Claims, 3 Drawing Sheets

MOBILE NODE ENTRY AT RADIO ACCESS ARRANGEMENT RESTART

CROSS-REFERENCE TO RELATED APPLICATION

This application is a 35 U.S.C. §371 National Phase Entry Application from PCT/PCT/EP2009/051797, filed Feb. 16, 2009, and designating the United States, the disclosure of which is incorporated herein in its entirety by reference.

TECHNICAL FIELD

The invention relates to communication between nodes and/or node arrangements in wireless communication networks. In particular, the invention relates to a node/node arrangement in a wireless communication network communicating with a plurality of radio nodes.

BACKGROUND

Mobility is a fundamental precondition in most modern wireless communication networks. Accordingly, most wireless communication systems comprise mobile nodes (e.g. cell phones or similar) and radio access nodes (e.g. base stations or similar) configured to operatively provide wireless communication for the mobile nodes in the wireless communication system.

Well known examples of wireless communication systems comprising mobile nodes or similar can be found in the Global System for Mobile communications (GSM), the General Packet Radio Service (GPRS), the Wideband Code Division Multiple Access (WCDMA), the High Speed Packet Access (HSPA), Long Term Evolution (LTE) and other cellular technologies or similar intended for a more or less global access. Other examples of systems comprising mobile nodes or similar can be found in the Worldwide Interoperability for Microwave Access (WiMAX) and other wireless communication networks or similar intended for more or less local or regional access.

A radio access node in such wireless communication systems as those exemplified above or similar is typically configured to communicate with a plurality of mobile nodes in the coverage area of the access node (e.g. within a cell covered by the radio access node). A mobile node in the coverage area of a radio access node may be active or idle. Active mobile nodes are typically known to the communication system at radio access node level. For example, the core network or similar of the system may have information about the geographical location of a mobile node based on the geographical location of the radio access node in question. As a contrast, idle mobile nodes may only be known by the core network at a higher level, e.g. on a paging group level or tracking area level or similar. In other words, idle mobile nodes are typically not known at radio access node level.

For each active mobile node there is a mobile node context. The mobile node context may e.g. be set up and/or held by the radio access network (e.g. a radio access node) and/or the core network or similar of the wireless communication network. The mobile node context of a mobile node may e.g. comprise the identity and/or properties of the mobile node and/or the capabilities and services that have been set up for the mobile node etc. More generally, the mobile node context for a specific mobile node contains the necessary information needed for the radio access node to communicate with the mobile node. An example of a mobile node context is the so-called user equipment (UE) context defined within the framework of the specifications provided by the 3GPP (Third Generation Partnership Project, see e.g. www.3gpp.org). A mobile node context of some sort can be found in almost every modern wireless communication systems, e.g. as those exemplified above or similar. The typical constitution and use of various mobile node contexts or similar is well known to those skilled in the art and it needs no further explanation.

If the operation of a radio access node serving a plurality of mobile nodes fails such that the radio access node has to be restarted the mobile node context for all or a majority of the served mobile nodes may be lost. As a consequence, a majority of the served mobile nodes may have to renew their association with the radio access node and reestablish their mobile node context respectively. This is applicable to wireless communication networks in general and to cellular wireless communication networks in particular. In a typical scenario there may be several hundred mobile nodes located within the range of and served by a radio access node.

Figure 1:
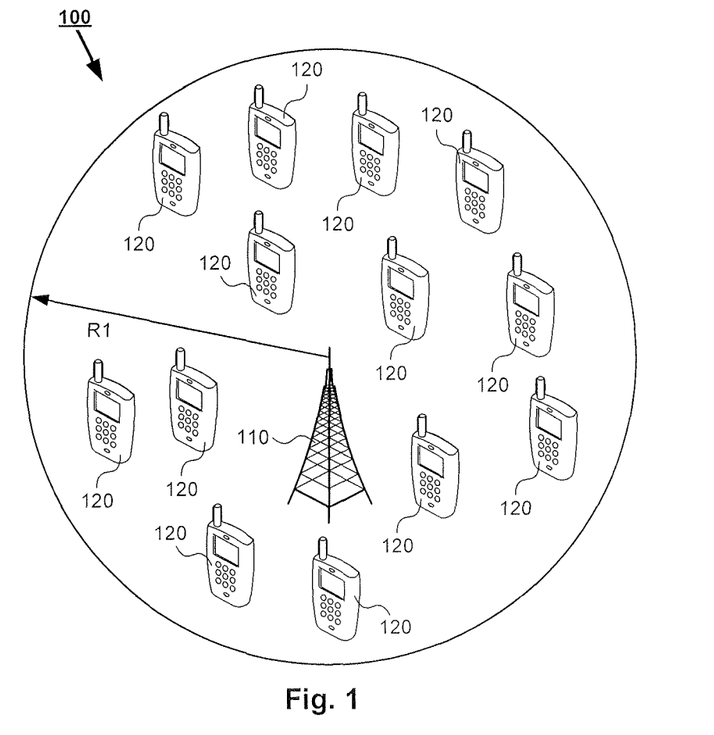
FIG. 1 is a schematic illustration of an exemplifying wireless communication system comprising a base station and a plurality of mobile terminals.

A schematic illustration is provided in FIG. 1 showing an exemplifying wireless communication system 100 comprising a radio access node 110 (e.g. a base station) with a schematic coverage area (e.g. cell) defined by the radius R1, and a plurality of mobile nodes 120 (e.g. cell phones). In case of a restart of the radio access node 110 there may be several hundred mobile nodes accessing the radio access node for a renewed association and a reestablished mobile node context.

The association of a mobile node 120 with a radio access node 110 requires a number of resources in the radio access node 110. Most notably, the association requires an initial access capacity and a payload capacity to be provided. The initial access capacity is required for the initial network entry, whereas the payload capacity is required for continued access to the network resources. The features of access and payload capacity are well known to a person skilled in the art and they need no further description.

There is always a tradeoff between the initial access capacity for network entry and the payload capacity (e.g. reserved for transmission of data such as payload and control signaling). The initial access capacity for network entry is typically dimensioned for a steady-state scenario with a few entry events per second. This is done to avoid any waste of capacity that can be used for payloads.

However, a low capacity for the initial access function is not adequate if a large number of mobile nodes 120 are accessing a radio access node 110 for a network entry in a short period of time. This is particularly so in a restart scenario as described above. A low capacity for the initial access function will then increase the time required for the mobile nodes 120 to renew their association and mobile node context, which decreases the probability that a service provided to a particular mobile node can be upheld by the wireless communication system 100. In addition, a low capacity for the initial access function will also increase the risk that the radio access node 110 may not detect all the accessing mobile nodes 120. On the other hand, if the initial access capacity is high, the capacity for payloads will be unnecessarily reduced during ordinary operations (e.g. in a steady-state scenario).

Hence, in view of the above there seems to be a need for improvements directed to the capacity allocated to initial access for network entry and the capacity allocated to payloads in a wireless communication system.

SUMMARY

The present invention provides a solution that eliminates or reduces at least one of the disadvantages discussed in the background section above. Hence, the present invention provides at least one improvement with respect to the discussion above, which improvement is accomplished according to a first embodiment of the invention directed to a method in a radio access arrangement for improving the balance between the capacity allocated to initial access for network entry and the capacity allocated to payloads in the radio access arrangement. The radio access arrangement is configured to operatively communicate with a plurality of mobile nodes via an air interface.

The method comprises the steps of: setting an initial access capacity to a value, obtaining a current initial access load, and increasing the initial access capacity provided by the radio access arrangement if the current initial access load exceeds a predetermined upper limit.

In an alternative embodiment of the method according to the present invention the method is executed subsequent to a restart of the radio access arrangement.

In yet an alternative embodiment of the method according to the invention, the initial access capacity is set such that a predetermined minimum payload capacity to the resources provided by the radio access arrangement is provided.

In still an alternative embodiment of the method according to the present invention the initial access capacity provided by the radio access arrangement is not increased above a predetermined level, e.g. a predetermined maximum level.

In a further alternative embodiment of the method according to the present invention the initial access capacity is temporarily increased by temporarily decreasing the capacity provided for payload by the radio access arrangement.

In another alternative embodiment of the method according to the present invention the initial access capacity is temporarily increased by temporarily increasing the period during which each mobile node waits before sending a request to the radio access arrangement for a new association and/or a reestablished mobile node context.

In still another alternative embodiment of the method according to the invention the increase is preformed in a single large increasing step or in a series of small increasing steps.

In yet an alternative embodiment of the method according to the present invention the initial access capacity provided by the radio access arrangement is temporarily decreased if the current initial access load is below a predetermined lower limit.

In a further alternative embodiment of the method according to the present invention the initial access capacity provided by the radio access arrangement is not decreased below a predetermined level, e.g. a predetermined minimum level.

In still an alternative embodiment of the method according to the invention the decrease is performed in a single large decreasing step or in a series of small decreasing steps.

In yet an alternative embodiment of the method according to the present invention the steps of the method is repeated if the current initial access load has not reached a steady state.

In a further alternative embodiment of the method according to the present invention the initial access capacity is set to a value if the current initial access load has reached a steady state and then the method is ended.

In addition, the present invention provides at least one improvement with respect to the discussion in the background above. The improvement is accomplished according to a second aspect of the invention directed to a node arrangement arranged to be operative in a wireless communication network so as to operatively communicate with a plurality of radio nodes via an air interface. The node arrangement is arranged to set an initial access capacity to a value, to obtain a current initial access load, and to increase the initial access capacity provided by a radio access arrangement if the current initial access load exceeds a predetermined limit.

In alternative embodiment of the node arrangement according the second aspect of the present invention, the node arrangement is arranged to temporarily decrease the initial access capacity provided by the radio access arrangement to an initial access capacity adapted for steady state conditions.

Further advantages of the present invention and embodiments thereof will appear from the following detailed description of the invention.

The objects of this invention are obtained as described in the accompanying claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the steps of the methods defined in the appended claims may, without departing from the present invention, be performed in another order than the order in which they appear in the claims.

DETAILED DESCRIPTION

A First Exemplifying Communication System

Figure 2:
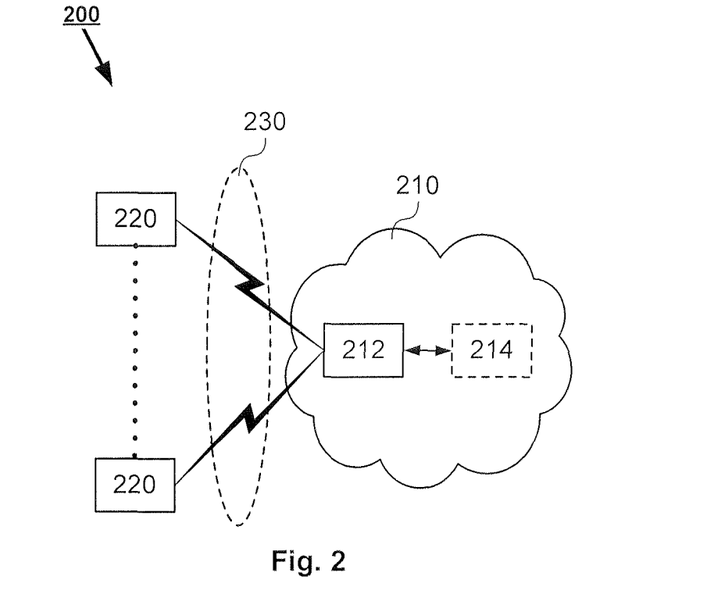
FIG. 2 is a schematic illustration of an exemplifying wireless communication system according to a first embodiment of the present invention.

FIG. 2 is a schematic illustration of an exemplifying general wireless communication system 200 according to a first embodiment of the present invention. The wireless communication system 200 may e.g. be a cellular or a non-cellular communication system. It is preferred that the system 200 is intended for a substantially local or regional access, e.g. according to WiMAX technology as defined in the IEEE 802.16 standards, or according to HIPERMAN, iBurst or WiBro or similar. However, this does not preclude that the system 200 may be intended for a more or less global access based on other wireless technologies providing cellular or no-cellular communication.

As can be seen in FIG. 2, the communication system 200 comprises a wireless communication network 210 and a plurality of mobile nodes 220.

It is preferred that the mobile nodes 220 are wireless terminals configured to operatively communicate with a radio access arrangement 212 in the network 210 via an air interface 230. Mobile nodes of this kind (e.g. a laptop computer or similar provided with communication ability according to IEEE 802.16 or similar) are well known per se to those skilled in the art and they need no detailed description as such. However, particular features of the mobile nodes 220 according to embodiments of the present invention will be elaborated later.

The radio access arrangement 212 of the wireless communication network 210 is preferably a base station arrangement or a similar radio access node arrangement. As indicated above, the radio access arrangement 212 is preferably configured to operatively communicate with one or several mobile nodes 220 via an air interface 230; see the two nodes 220 in FIG. 2 being connected with a dotted line to schematically illustrate a plurality of mobile nodes 220. Before we proceed it should be emphasised that the communication network 210 may comprise a plurality of radio access arrangements 212.

Access arrangements such as the radio access arrangement 212 or similar are well known per se to those skilled in the art (see e.g. the IEEE 802.16 standard or similar). Hence, they need no detailed description as such. However, it should be emphasised that the radio access arrangement 212 is configured to operatively control at least parts of the initial access function and/or the payload function provided by the radio access arrangement 212 to the mobile nodes 220. Preferably, the initial access is a random access. Other particular features of the radio access node arrangement 212 will be elaborated later.

The wireless communication network 210 may also comprise a core network arrangement 214 configured to operatively control the function of the radio access arrangement(s) 212. The core network arrangement 214 may e.g. comprise a core network node arrangement. The core network arrangement 214 may be configured to operatively control at least parts of the initial access function and/or the payload function provided by the radio access arrangement 212 to the mobile nodes 220. The core network 214 is preferably configured to operatively act as an interface between the access node arrangement 212 and various external data networks or similar, e.g. such as a Public Data Network (PDN) or similar. The Internet is a well known example of a PDN.

The access node arrangement 212 and the core network arrangement 214 are shown as separate units in FIG. 2. However, other embodiments may have these arrangements 212, 214 fully or at least partly arranged in the same physical and/or logical unit or units.

A Second Exemplifying Communication System

Figure 3:
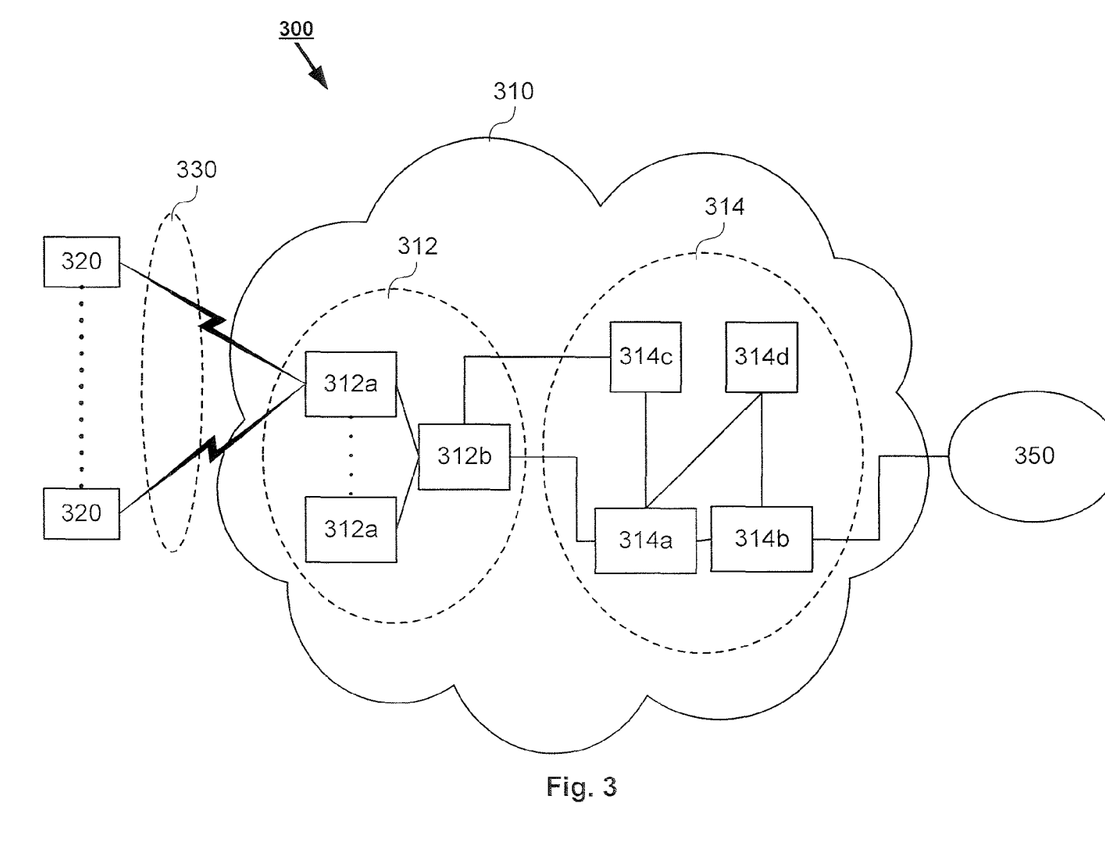
FIG. 3 is a schematic illustration of an exemplifying wireless communication system according to a second embodiment of the present invention.

The attention is now directed to a second exemplifying wireless communication system 300 schematically illustrated in FIG. 3. The communication system 300 may e.g. be a cellular or a non-cellular communication system. It is preferred that the system 300 is intended for a substantially global access, e.g. according to the Global System for Mobile communications (GSM), General Packet Radio Service (GPRS), Wideband Code Division Multiple Access (WCDMA), High Speed Packet Access (HSPA) or similar intended for a more or less global access. It is generally preferred that the system 300 is a wireless communication system defined within the framework of the specifications provided by the 3GPP.

As can be seen in FIG. 3, the communication system 300 comprises a wireless communication network 310 and one or several mobile nodes 320.

In fact, FIG. 3 is a schematic overview of an exemplifying general wireless communication system 300 in which various network elements and interfaces are shown. The structure and operation of a general wireless communication system is well known per se to those skilled in the art and it needs no detailed explanation. However, a brief overview of the exemplifying wireless communication system 300 in FIG. 3 is provided below.

It is preferred that the mobile nodes 320 of the system 300 are wireless terminals configured to operatively communicate with a radio access network arrangement 312 in the wireless communication network 310 via an air interface 330. Mobile nodes of this kind (e.g. cell phones or similar such as the Mobile Station (MS) or User Equipment (UE) defined by the standards provided by the 3GPP) are well known per se to those skilled in the art and they need no detailed description as such. However, particular features of the mobile nodes 320 according to embodiments of the present invention will be elaborated later.

It is preferred that the radio access network arrangement 312 in the wireless communication network 310 comprises at least one radio access node arrangement, e.g. one or several base station arrangements 312a or similar radio access nodes. It is also preferred that the radio access network arrangement 312 comprises one or several base station controller arrangements 312b or similar radio access control nodes.

The base station arrangements 312a of the access network arrangement 312 are preferably configured to operatively communicate with one or several mobile nodes 320 via an air interface 330; see the two nodes 320 in FIG. 3 connected with a dotted line to schematically illustrate a plurality of mobile nodes 320. Radio access nodes such as the base station arrangements 312a or similar are well known per se to those skilled in the art, e.g. the Base Transceiver Station (BTS) and/or the NodeB and/or the eNodeB, or similar defined by the standards provided by the 3GPP. Hence, the base station arrangements 312a in FIG. 3 do not need any detailed description as such. However, it should be emphasised that a base station arrangement 312a is configured to operatively control at least parts of the initial access function and/or the payload function provided by the base station arrangement 312a to the mobile nodes 320. Preferably, the initial access is a random access. Other particular features of the base station arrangement 312a will be elaborated later.

In addition, it is preferred that the access network arrangement 312 comprises a base station controller arrangement 312b. The base station controller arrangement 312b is preferably configured to operatively control a group of base station arrangements 312a, e.g. configured to operatively control at least parts of the initial access function and/or the payload function provided by a base station arrangement 312a to the served mobile nodes 320. The base station controller arrangement 312b and the base station arrangements 312a are shown in FIG. 3 as separate units. However, other embodiments may have the base station controller arrangement 312b and one or several base station arrangements 312a fully or at least partly arranged in the same physical and/or logical unit or units. Various base station controller arrangements or similar are well known per se to those skilled in the art, e.g. the Base Station Controller (BSC), the Radio Network Controller (RNC) and/or arrangements where the controller is a part of the Base Station or similar defined by the standards provided by the 3GPP. Hence, the base station controller arrangements 312b in FIG. 3 do not need any detailed description as such.

As can be seen in FIG. 3 it is also preferred that the wireless communication network 310 of the system 300 comprises a core network arrangement 314 or similar. The core network 314 is configured to operatively act as an interface between the radio access network arrangement 312 and various external data networks such as e.g. a Public Data Network (PDN) 350 as shown in FIG. 3. The Internet is a well known example of a PDN.

The core network 314 may e.g. comprise a Serving Node 314a and a Gateway Node 314b or a similar core network node arrangement. Various Serving Nodes and/or Gateway Nodes are well known to those skilled in the art, e.g. the Serving GPRS Support Node (GGSN) and/or the Gateway GPRS Support Node (GGSN), Mobility Management Entity (MME), Serving Gateway (S-GW) or similar defined by the standards provided by the 3GPP. In the exemplifying FIG. 3 it can be seen that the Gateway Node 314b operates at one end of the core network 314 as an interface between the core network 314 and various external data networks 350 or similar. At another end of the core network 314 the Serving Node 314a operates as an interface between the core network 314 and at least one radio access network 312. The Serving Node 314a and the Gateway Node 314b are shown in FIG. 3 as separate units. However, other embodiments may have the Serving Node 314a and the Gateway Node 314b fully or at least partly arranged in the same physical and/or logical unit or units.

The core network 314 may also comprise a Mobile Switching Center (MSC) 314c or similar and various location registers or similar, e.g. such as a Visitor Location Register (VLR) or similar (possibly being hosted by the MSC 314c) and a Home Location Register (HLR) 314d or similar. The MSC 314b may i.a. be responsible for handling voice calls as well as other services (such as conference calls, FAX and circuit switched data etc). The HLR or similar may be a central database that contains details of each mobile node 320 subscriber that is authorized to use the core network 314. The VLR or similar may be a temporary database of subscribers who have roamed into a particular area which the VLR serves, e.g. moved in to an area covered by a base station arrangement 312a or a base station controller arrangement 312b.

Naturally, a radio access network arrangement and/or a core network acting as an interface between the access network arrangement and various external data networks may, without departing from the present invention, have other configurations departing from the access network 312 and/or core network arrangement 314 in FIG. 3.

Operation of Embodiments

As previously discussed in the background section, a failure of a radio access node 212, 312a serving a plurality of mobile node arrangements 220, 320 may require a restart of the radio access node 212, 312a in question. The restart may cause a loss of the mobile node contexts for the served mobile nodes 220, 320. As a consequence, the served mobile nodes 220, 320 may have to renew their association with the radio access node 212, 312a and/or reestablish their mobile node context respectively. This requires a number of resources in the radio access node 212, 312a. Most notably, the association requires an initial access capacity and a payload capacity to be provided by the radio access node 212, 312a to the served mobile nodes 220, 320. As observed in the background section, the initial access capacity is mainly required for the network entry, whereas payload capacity is mainly required for continued access to the network resources.

As an example, in Mobile WiMAX a restart is often mandated in case of failure of a serving radio access node. Taking the system 200 in FIG. 2 as an example, a restart of the serving access node arrangement 212 may result in that a plurality of the served mobile nodes 220 have to renew their association with the radio access node 212. In case of Mobile WiMAX this involves a random access procedure.

The following example, discussed with reference to the exemplifying system 200 in FIG. 2, illustrates the random initial access procedure for Mobile WiMAX. Other wireless systems such as the above system 300 or similar operate in the same or similar manner. The random initial access at network entry—called initial ranging in Mobile WiMAX—is i.a. controlled by the following parameters:

Initial ranging interval
Number of ranging slots per initial ranging region
Number of initial ranging codes
Initial ranging backoff start
Initial ranging backoff end In each frame, the uplink map specifies if initial ranging can be made (if there is an initial ranging region), and how many ranging slots that are available in the initial ranging region.

If a mobile node 220 in the exemplifying system 200 shown in FIG. 2 wishes to perform initial ranging, it shall randomly select a ranging code and transmit it in a randomly selected ranging slot. The available ranging codes are broadcasted as system information.

In order to select a ranging slot, the mobile node 220 shall use a so-called random backoff. This means that the mobile node 220 shall randomly select a number in the range $[0, 2^{Initial\ ranging\ backoff}-1]$. Since the number of ranging slots in a ranging region typically is less than $2^{Initial\ ranging\ backoff}$, the mobile node 220 shall wait a number of frames before performing initial ranging.

The mobile node 220 shall set Initial ranging backoff to Initial ranging backoff start for the first attempt. For each re-attempt due to collision, it shall increase Initial ranging backoff until Initial ranging backoff end is reached.

The random access/ranging mechanisms for Mobile WiMAX are e.g. described in IEEE 802.16-2004 and IEEE 802.16e-2005, see e.g. sections 6.3.8, 8.4.7, 6.3.9.5.1 and 6.3.10.3.1.

Now, in the background section it was stated that improvements seems to be needed regarding the capacity allocated to initial access for network entry and the capacity allocated to payload for continued access to the network resources.

The present invention provides such improvements by temporarily increasing the initial access capacity after restart of a radio access node 212, 312a in a wireless communication system 200, 300. As a consequence, the period needed for the served mobile nodes 220, 320 to renew their association with the radio access node 212, 312 after restart will be reduced.

It should be observed that the initial access capacity is only temporarily increased after restart. The initial access capacity is subsequently decreased to fit a steady state condition or similar. Hence, the initial access capacity can be increased after restart without later wasting payload capacity at steady state conditions. A shorter time for renewal of association means that the mobile nodes 220, 320 will be out of service for a shorter time, and the probability for the survival of the service (e.g. such as web surfing or similar best effort services) provided to the mobile nodes 220, 320 will increase.

In the following discussion, the term Initial Access Load is defined as:

Initial Access Load=Initial Access Activity/Initial Access Capacity.

Figure 4:
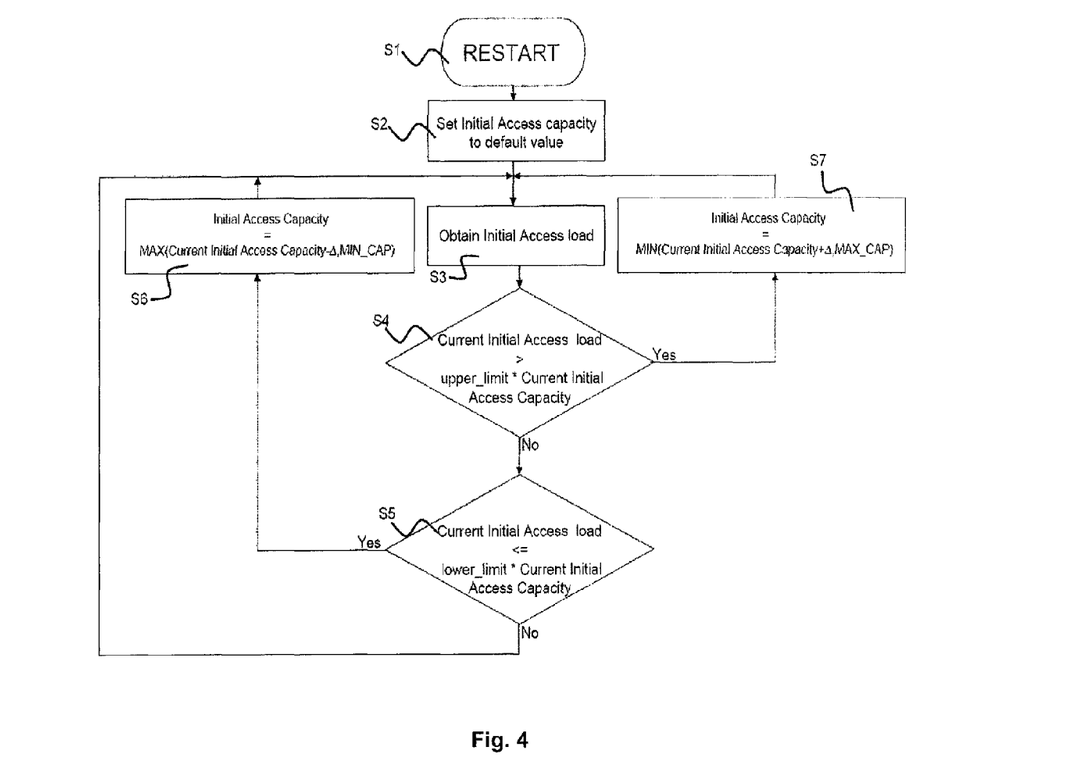
FIG. 4 is a schematic flowchart illustrating the operation of an embodiment of the invention.

The attention is now directed to the schematic flowchart shown in FIG. 4, which illustrates the operation of an exemplifying embodiment of the present invention. The operation is preferably performed by a radio access arrangement 212, 312 in one of the exemplifying wireless communication systems 200, 300 described above. However, this does not preclude that the operation can be at least partly performed by an access network arrangement 312 and/or by a core network arrangement 214, 314 being a part of the wireless communication system 200, 300 to which the radio access arrangement 212, 312 in question belongs.

The steps of the exemplifying operation illustrated by the flowchart in FIG. 4 will now be discussed in more detail below.

In a first step S1 it is preferred that a wireless communication system 200, 300 is activated. It is also preferred that a plurality of active mobile nodes 220, 320 of the communication system 200, 300 in question is within the range of at least one radio access arrangement 212, 312 in the communication system 200, 300. It should be emphasised that the communication system must not necessarily be a cellular communication system. Moreover, in the first step S1 it also assumed that the radio access arrangement 212, 312 in question has been recently restarted such that it has now reached a state where it is ready to participate in a renewal of an association with and/or an reestablishment of the mobile node context for the served mobile nodes 220, 320 in need of such renewals and/or reestablishments.

In a second step S2 it is preferred that a default amount of initial access capacity is allocated so that mobile nodes 220, 320 can access the network after the restart of the radio access arrangement 212, 312. This allocation of initial access capacity is required in order to be able to measure the current initial access load the first time.

In a third step S3 it is preferred that the initial access load is obtained. The third step S3 is preformed at least once after a restart of the radio access arrangement 212, 312. It is preferred that the current initial access load indicates if it is too small or too large (below a lower limit or above an upper limit) to handle all mobile nodes 220, 320. In other words, it is preferred that the current initial access load is indicative of the initial access activity imposed on the radio access arrangement 212, 312 in question, e.g. such as a Mobile WiMAX random access procedure or similar. E.g. if assuming that the initial access load indicates that all initial access capacity is used, then the conclusion is that the initial access capacity is too small, and it does not give any information about how many mobile nodes 220, 320 wanting to access the radio access arrangement 212, 312, but it only indicates that it is more than what the initial access capacity can handle. The current initial access load after a restart of the radio access arrangement 212, 312 may e.g. be measured, calculated, estimated and/or predicted or obtained in any other or similar manner.

In a fourth step S4 it is preferred to determine whether the current initial access load obtained in step S3 exceeds a upper limit of current initial access capacity (i.e. check if the capacity is over loaded):

Current Initial Access Load>Upper Limit*Current Initial Access Capacity

The process proceeds to step S7 if it is determined in step S4 that the current initial access load is overloaded. However, the process proceeds to a step S5, as will be described in more detail later, if it is determined in step S4 that the current initial access load is equal to or below a predetermined upper limit. The limit corresponds to a current access load that is regarded as overloaded. Hence, there is a need of extra initial access capacity in order to reach adequate initial access load.

In step S7 it is preferred that the capacity provided for initial access by the radio access arrangement 212, 312 is increased with an amount of delta, Δ. This may e.g. be accomplished by temporarily decreasing the capacity provided for payload by the radio access arrangement 212, 312. The free capacity can then be used for handling the initial access load imposed on the radio access arrangement 212, 312. It is preferred that the initial access capacity provided by the radio access arrangement 212, 312 is not increased above a predetermined upper level, e.g. a predetermined maximum level, MAX_CAP. In other words, the initial access capacity is set such that it does not exceed a predetermined maximum initial access capacity in order to assure resources for payload provided by the radio access arrangement 212, 312. It is further preferred that the increase is either preformed in a single large increasing step or in a series of small increasing sub-steps, Δ, e.g. one sub-step each time step S7 is executed. The increase of Initial Access Capacity is preferably performed as follows:

Initial Access Capacity=MIN(Currrent Initial Access Capacity+Δ,MAX_CAP)

It is also preferred that the maximum initial access capacity (MAX_CAP) is set such that a certain minimum payload capacity for access to the resources provided by the radio access arrangement 212, 312 is always assured. In other words, the predetermined upper limit should preferably not be set such that the initial access capacity can rise to a level when it substantially exhausts all payload capacity of the radio access arrangement 212, 312. For example, the minimum payload capacity should preferably be sufficient to at least support the survival of best effort services or similar for the served mobile node 220, 320 during a restart of the radio access arrangement 212, 312. A suitable setting for the predetermined upper limit may e.g. be obtained by empirical knowledge about the operational wireless communication system 200, 300 and/or by simulations of modeled wireless communication system 200, 300 etc.

In Mobile WiMAX the number of ranging occasions per time unit may be increased by e.g. decreasing the Initial ranging interval compared to the steady state settings. More general, the initial access capacity may be increased by e.g. decreasing the minimum interval at which the mobile nodes 220, 320 served by a radio access arrangement 212, 312 are allowed to request the radio access arrangement 212, 312 in question for a new association and/or a reestablished mobile node context (e.g. allowing a higher request rate or a higher request frequency compared to steady state settings).

In Mobile WiMAX or similar the initial access capacity may be increased by e.g. increasing the initial ranging backoff. More general, the initial access capacity may be increased by e.g. increasing the period during which each mobile node 220, 320 served by a radio access arrangement 212, 312 waits before sending a first request to the radio access arrangement 212, 312 for a new association and/or a reestablished mobile node context. This may give an inherent delay in the initial access process. However, it will reduce the probability that the requests from two mobile nodes 220, 320 collide, e.g. that two requests are made substantially simultaneous to the radio access arrangement 212, 312 in question. A reduction of such collisions will reduce the number of renewed requests and thus reduce the total time required for the served mobile nodes 220, 320 to renew their association with the radio access node 212, 312a in question and/or reestablish their mobile node context respectively. Other possible ways to temporarily increase the initial access capacity can be by borrowing resources from neighboring cells (e.g. time/frequencies/codes) or to use a simplified initial access for substantially stationary mobile stations.

Step S7 has now been described in some detail. As already indicated above, the process only proceeds to step S7 if it is determined in step S4 that the current initial access load exceeds the limit. However, as also indicated above, the process proceeds to a step S5 if it is determined in step S4 that the current initial access load is equal to or below the upper limit.

In the step S5 it is preferred to determine whether the current initial access load obtained in step S3 is equal to or below a predetermined lower limit of the Current Initial Access Capacity (i.e. if the capacity is under-loaded):

Current Initial Access Load<Lower Limit*Current Initial Access Capacity

As will further described below, the process proceeds back to step S3 if it is determined in step S5 that the current initial access load is not equal to or below the current initial access capacity. However, the process proceeds to step S6 if it is determined in step S5 that the current initial access load is equal to or below the initial access load at steady state conditions.

It is preferred that the initial access activity at steady state conditions corresponds to the normal conditions wherein substantially all mobile nodes 220, 320 served by a radio access arrangement 212, 312 are associated with the radio access arrangement 212, 312 and/or have an established mobile node context. It is preferred that the initial access load is within a specified range around an ideal load value, i.e. between a lower limit and an upper limit (handled by the steps S4 and S5). When the process has been iterated a number of times and the initial access load is regulated by increasing or decreasing initial access capacity, the load will correspond to the load generated by the steady state load. Then, one knows which initial access capacity being needed for the steady state load. The purposes of the limits are only to create hysteresis.

In step S6 it is preferred that the capacity provided for initial access by the radio access arrangement 212, 312 in question is decreased with amount of delta, Δ:

Initial Access Capacity=MAX(Current Initial Access Capacity-Δ,MIN_CAP)

It is preferred that step S6 is the opposite of the previously discussed step S7. In other words, it is e.g. preferred that any action (e.g. increase or decrease or similar) taken in step S7 is reversed by an opposite action in step S6. In one embodiment it is preferred that the capacity provided for initial access by the radio access arrangement 212, 312 in question is decreased to an initial access capacity adapted for steady state conditions. It is further preferred that the decrease is preformed in a single large decreasing step or in a series of small decreasing sub-steps, Δ, as previously indicated. However, the Initial access capacity will never fall below a predetermined lower level, MIN_CAP.

Step S6 has now been described in some detail. As already indicated above, the process only proceeds to step S6 if it is determined in step S5 that the current initial access load is underloaded, i.e. equal to or below steady state conditions (below a predetermined lower limit). However, as also indicated above, the process proceeds back to step S3 if it is determined in step S5 that the current initial access load is not equal to or below the conditions of the current initial access load.

The process described with reference to steps S1-S7 above may be repeated, e.g. repeated a predetermined number of times, repeated during a predetermined period of time, repeated forever, or repeated until it is terminated by the communication network 200, 300 or any node or node arrangement therein. In this manner, the initial access load can be substantially continuously obtained. The current initial access capacity can be dynamically updated in order to handle additional cases when many served mobile nodes 220, 320 request the radio access arrangement 212, 312 in question for a renewed association and/or a reestablished mobile node context. This can be applicable for radio access arrangement 212, 312 handling cells located at e.g. airports and sports arenas.

If it in step S5 is determined that the current initial access load is not equal or below the conditions of the current initial access load (the lower limit) the process proceeds to a step (not shown in FIG. 4) determining whether the current initial access load has reached a steady state. If a steady state is not reached, the process proceeds back to step S3. If a steady state is reached, the process proceeds to another step (not shown in FIG. 4) where an initial access capacity is set to an adequate value based on the current initial access load, and then the process is ended.

When the process has been iterated a number of times and the initial access load is regulated by increasing or decreasing the initial access capacity, the load will correspond to the load generated by the steady state load. Then, one knows which initial access capacity being needed for the steady state load. The purposes of the limits of the initial access load in S4 and S5 are only to create hysteresis. Thus, the whole flow chart shown in FIG. 4 provides allocation of a suitable amount of initial access capacity so that the initial access load is held between a desired upper and lower limit. This means that the resource allocation is optimal leading to maximize resources for data transmission at the same time as adequate resources are allocated (secured) for Initial Access.

The present invention has now been described with reference to exemplifying embodiments. However, the invention is not limited to the embodiments described herein. On the contrary, the full extent of the invention is only determined by the scope of the appended claims.

The invention claimed is:

1. A method in a radio access arrangement operative in a wireless communication system for improving the balance between the capacity allocated to initial access for network entry and the capacity allocated to payloads in the radio access arrangement, the radio access arrangement being configured to operatively communicate with a plurality of mobile nodes via an air interface, said method comprises the steps of:
   setting an initial access capacity;
   obtaining a current initial access load;
   determining that the current initial access load exceeds a predetermined upper limit;
   temporarily increasing the initial access capacity provided by the radio access arrangement after a restart of the radio access arrangement in response to determining that the current initial access load exceeds the predetermined upper limit, wherein
   the step of temporarily increasing the initial access capacity comprises temporarily increasing the period during which each mobile node waits before sending a request to the radio access arrangement for a new association and/or a reestablished mobile node context;
   determining that the current initial access load is below a predetermined lower limit; and
   in response to determining that the current initial access load is below the predetermined lower limit:
   a) decreasing the initial access capacity provided by the radio access arrangement, and
   b) increasing a payload capacity provided by the radio access network.

2. The method according to claim 1, wherein the initial access capacity is set such that a predetermined minimum payload capacity is provided to the resources provided by the radio access arrangement.

3. The method according to claim 1, wherein the initial access capacity provided by the radio access arrangement is not increased above a predetermined maximum level.

4. The method according to claim 1, wherein the step of temporarily increasing the initial access capacity comprises temporarily decreasing the capacity provided for payload by the radio access arrangement.

5. The method according to claim 1, wherein the increase is performed in a single large increasing step or in a series of small increasing steps.

6. The method according to claim 1, wherein the initial access capacity provided by the radio access arrangement is not decreased below a predetermined minimum level.

7. The method according to claim 1, wherein the decrease is performed in a single large decreasing step or in a series of small decreasing steps.

8. The method according to claim 1, wherein the method further comprises the step of repeating the steps of the method if the current initial access load has not reached a steady state.

9. The method according to claim 1, wherein the method further comprises the steps of:
    setting the initial access capacity to a value if the current initial access load has reached a steady state; and
    ending the method.

10. A node arrangement arranged to be operative in a wireless communication network so as to operatively communicate with a plurality of mobile nodes via an air interface, said node arrangement is arranged to;
    set an initial access capacity;
    obtain a current initial access load;
    determine whether the current initial access load exceeds a predetermined upper limit; and
    temporarily increase the initial access capacity provided by a radio access arrangement after a restart of the radio access arrangement in response to determining that the current initial access load exceeds the predetermined upper limit, wherein:
    said node arrangement is arranged to temporarily increase the initial access capacity by temporarily increasing the period during which each mobile node waits before sending a request to the radio access arrangement for a new association and/or a reestablished mobile node context,
    setting the initial access capacity comprises setting an initial ranging backoff parameter to an initial backoff value for use by the mobile nodes in determining an amount of time, or a number of frames, that the mobile nodes will wait before transmitting a certain message to the node arrangement, and
    increasing the initial access capacity comprises setting the initial ranging backoff parameter to a new backoff value that is greater than the initial backoff value and transmitting the new backoff value so that it can be used by the plurality of mobile nodes.

11. The node arrangement according to claim 10, wherein said node arrangement is further arranged to determine whether the current initial access load has reached a steady state and to set the initial access capacity to a predetermined value in response to determining that the current initial access load has reached a steady state.

12. A method in a radio access arrangement operative in a wireless communication system for improving the balance between the capacity allocated to initial access for network entry and the capacity allocated to payloads in the radio access arrangement, the radio access arrangement being configured to operatively communicate with a plurality of mobile nodes via an air interface, said method comprises the steps of:
    setting an initial access capacity;
    obtaining a current initial access load;
    determining that the current initial access load exceeds a predetermined upper limit; and
    temporarily increasing the initial access capacity provided by the radio access arrangement after a restart of the radio access arrangement in response to determining that the current initial access load exceeds the predetermined upper limit, wherein:
    the step of temporarily increasing the initial access capacity comprises temporarily increasing the period during which each mobile node waits before sending a request to the radio access arrangement for a new association and/or a reestablished mobile node context,
    setting the initial access capacity comprises setting an initial ranging backoff parameter to an initial backoff value for use by the mobile nodes in determining an amount of time, or a number of frames, that the mobile nodes will wait before transmitting a certain message to the node arrangement, and
    increasing the initial access capacity comprises setting the initial ranging backoff parameter to a new backoff value that is greater than the initial backoff value and transmitting the new backoff value so that it can be used by the plurality of mobile nodes.

13. The method according to claim 12, wherein setting the initial ranging backoff value to a new backoff value comprises:
    determining whether a first value is greater than a second value, wherein the first value is equal to the initial backoff value plus an predetermined offset value; and
    setting the initial ranging backoff parameter equal to one of the first value and the second value depending on whether the first value is determined to be greater than the second value.

14. The method according to claim 13, wherein the initial ranging backoff parameter is set to the first value when it is determined that the first value is not greater than the second value, and
    the initial ranging backoff value is set to the second value when it is determined that the first value is greater than the second value.

* * * * *

UNITED STATES PATENT AND TRADEMARK OFFICE
CERTIFICATE OF CORRECTION

PATENT NO. : 8,964,545 B2
APPLICATION NO. : 13/201295
DATED : February 24, 2015
INVENTOR(S) : Johansson et al.

It is certified that error appears in the above-identified patent and that said Letters Patent is hereby corrected as shown below:

IN THE SPECIFICATION

In Column 1, Line 8, delete "PCT/PCT/EP2009/051797," and insert -- PCT/EP2009/051797, --, therefor.

In Column 6, Line 66, delete "(GGSN) and/or" and insert -- (SGSN) and/or --, therefor.

In Column 7, Line 20, delete "MSC 314b may i.a." and insert -- MSC 314c may i.e. --, therefor.

In Column 7, Line 66, delete "i.a." and insert -- i.e. --, therefor.

IN THE CLAIMS

In Column 13, Line 25, in Claim 10, delete "to;" and insert -- to: --, therefor.

Signed and Sealed this
Sixth Day of October, 2015

Michelle K. Lee
*Director of the United States Patent and Trademark Office*